Aug. 16, 1949.　　　　　A. PORTMANN　　　　　2,478,979
DRIVING MEANS FOR THE SPINDLES OF SPINNING,
TWISTING, AND LIKE MACHINES
Filed Dec. 23, 1947　　　　　　　　　　　　　　2 Sheets-Sheet 1
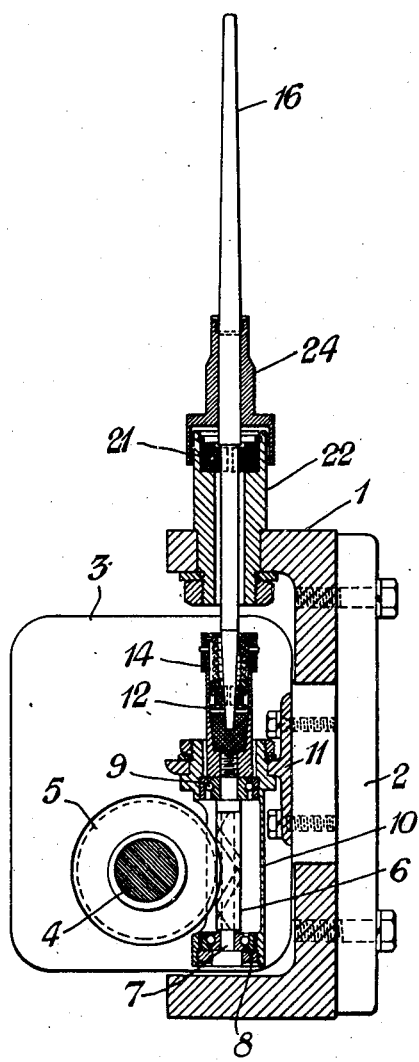
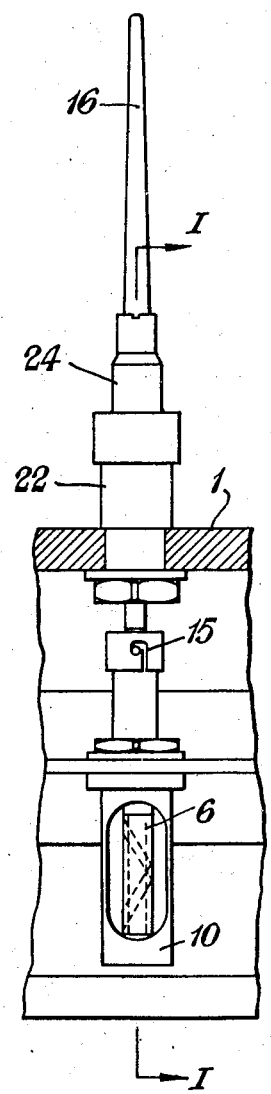
INVENTOR:
ANTON PORTMANN
ATTORNEY Aug. 16, 1949.  A. PORTMANN  2,478,979
DRIVING MEANS FOR THE SPINDLES OF SPINNING,
TWISTING, AND LIKE MACHINES
Filed Dec. 23, 1947  2 Sheets-Sheet 2

INVENTOR:
ANTON PORTMANN
Raymond W Cotton
ATTORNEY

Patented Aug. 16, 1949

2,478,979

UNITED STATES PATENT OFFICE 2,478,979

DRIVING MEANS FOR THE SPINDLES OF SPINNING, TWISTING, AND LIKE MACHINES

Anton Portmann, Zurich, Switzerland, assignor of one-half to Alois Ruckstuhl, Wil (St. Gall), Switzerland Application December 23, 1947, Serial No. 793,358 In Switzerland January 6, 1947

8 Claims. (Cl. 57—102)

This invention relates to spindles for spinning, twisting and the like machines and more particularly to an improved driving means therefor.

An apparatus for driving the spindles of spinning, twisting and the like machines has already been proposed in which a friction coupling is interposed between a directly driven driving shaft and a coaxially arranged spindle and held in the coupled position by spring pressure, whereby in the event of axial displacement of the spindle against the spring pressure the spindle is uncoupled from the driving shaft and comes to rest.

Apparatus of the foregoing kind suffer from the disadvantage that, due to the high spindle speeds encountered, the friction coupling does not permit accurate automatic centering of the spindle axis by the spring pressure.

An object of the present invention is to overcome the foregoing disadvantage and to this end a friction driver is incorporated between a directly driven driving shaft and a coaxial spindle, said driver continuously making contact at the point of friction both during rotation of the spindle and when it is at rest, whilst the end of the spindle shaft projects into and is guided by a centering bearing carried by the driving shaft.

Conveniently, the friction driver may comprise a spring-loaded disc operatively connected to the driving shaft, one face of which is pressed against a plate secured to the spindle shaft.

Another object of the invention is directed to dispensing with the need for periodical lubrication of the friction and bearing surfaces by constructing the friction drive disc and the centering bearing of graphite.

Figure 3:
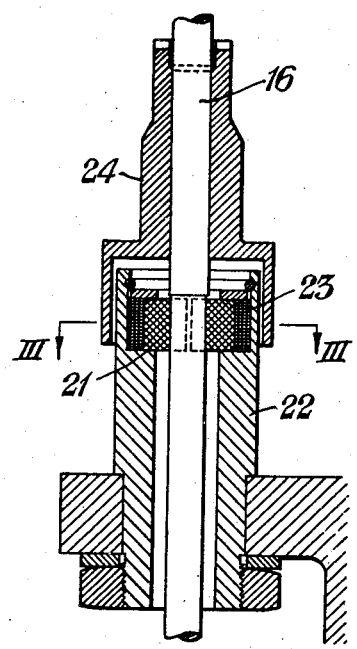
Figure 4:
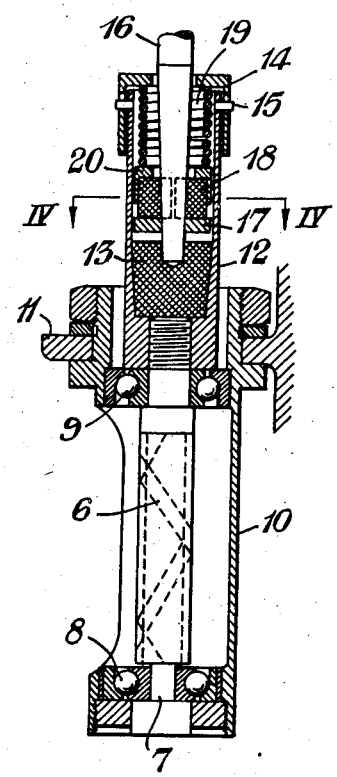
Figure 3A:
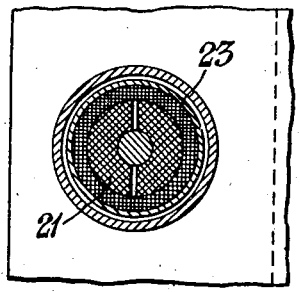
Figure 4A:
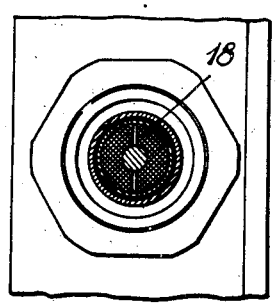

Further features and advantages of the device of the present invention will become apparent from the following description taken in conjunction with the accompanying drawings which illustrate diagrammatically and by way of example one embodiment thereof and in which:

Fig. 1 is a longitudinal section through the apparatus along the line I—I of Fig. 2, Fig. 2 is a front view of the apparatus, Fig. 3 shows a detail of the spindle bearing in longitudinal section, Fig. 3a is a section along the line IIIA—IIIA of Fig. 3, Fig. 4 shows details of the friction drive means and driving shaft in longitudinal section, and Fig. 4a is a section along the line IVA—IVA of Fig. 4.

I denotes a spindle mounting beam of a spinning machine, on the cross-piece of which a bearing support 2 is mounted. This support passes through the cross-piece of the spindle beam and is provided at intervals with supports 3 for the bearings of a common longitudinal driving shaft 4, which carries a helical worm wheel 5 for each spindle, meshing with a worm 6 mounted on a driving shaft 7. The driving shaft 7 is mounted in two ball bearings 8 and 9, which are carried by a bush 10. The bush 10 is fixed in a support 11 bolted to the support 2.

A sleeve 12, tapered internally to receive a correspondingly tapered centering bearing 13, consisting, for example, of a graphite mass, is rigidly attached to the driving shaft 7. The upper end of the sleeve 12 is closed by a cover 14, which can be secured to the sleeve by a bayonet joint 15 (Fig. 2). 16 denotes a spindle, the lower end of which projects into the centering bearing 13. A plate 17 is mounted on the spindle shaft, the upper face of which lies against a disc 18, formed by two half-discs, secured to the driving shaft. The necessary bearing pressure for the friction drive is produced by a spring 19 which, by means of a holder 20 which at the same time serves as a spring plate, presses the disc 18 against the plate 17.

The spindle 16 is mounted in a plain bearing ring 21 in the form of two half collars which is accommodated in a bush 22 inserted into the upper flange of the spindle beam 1. A rubber ring 23 is interposed between the ring 21 and the bush 22 in order to compensate for any small errors in the axial alignment of the spindle. The ring 21 may, for example, be composed of a graphite mass. An anti-dust cover 24 closes the bush at the top.

If it is desired to bring the spindle with the thread spool mounted thereon to a temporary standstill, the spindle can be braked by being lightly gripped by the operative. The friction driver members 17 and 18 at once begin to slip on one another, and the centering bearing moves around the stationary end of the spindle shaft.

Instead of the above described helical worm wheel drive, other driving means, such as bevel gear wheels, may be used.

Without wasting existing spindles, it is possible to incorporate the friction driver of the invention in existing spinning or twisting machines.

I claim:

1. Driving arrangement for the spindles of spinning, twisting and the like machines, which comprises a spindle, a directly driven driving shaft coaxial with said spindle, a friction driver between said spindle and said shaft constituted by a plate on said spindle, a disc on said driving shaft, said plate and said disc lying upon one another in face-to-face relationship, and a spring continuously urging said parts into frictional engagement with one another, a recessed member on said shaft, and a centering bearing in said recess into which the shaft of said spindle projects.

2. Driving arrangement for the spindles of spinning, twisting and the like machines, which comprises a spindle, a directly driven driving shaft coaxial with said spindle, a friction driver between said spindle and said shaft constituted by a plate on said spindle, a graphite disc on said driving shaft, said plate and said disc lying upon one another in face-to-face relationship, and a spring continuously urging said parts into frictional engagement with one another, a recessed member on said shaft, and a centering bearing in said recess into which the shaft of said spindle projects.

3. Driving arrangement for the spindles of spinning, twisting and the like machines, which comprises a spindle, a directly driven driving shaft coaxial with said spindle, a friction driver between said spindle and said shaft constituted by a plate on said spindle, a disc on said driving shaft composed of two half-collars of graphite, said plate and said disc lying upon one another in face-to-face relationship, and a spring continuously urging said parts into frictional engagement with one another, a recessed member on said shaft and a centering bearing in said recess into which the shaft of said spindle projects.

4. Driving arrangement as claimed in claim 3, wherein the centering bearing is composed of a graphite mass.

5. Driving arrangement as claimed in claim 3, which further includes a mounting on said driving shaft for said disc, said mounting also serving as a bearing plate for said spring.

6. A driving arrangement for the spindles of spinning, twisting and the like machines, which comprises a spindle, a directly driven driving shaft coaxial with said spindle, a friction driver between said spindle and said shaft constituted by a plate on said spindle, a disc on said driving shaft, said plate and said disc lying upon one another in face-to-face relationship, and a spring continuously urging said parts into frictional engagement with one another, a sleeve rigidly attached to said driving shaft, a centering bearing in said sleeve into which the shaft of said spindle projects, said sleeve and said bearing being complementarily tapered to ensure a good frictional fit therebetween, and a cover detachably secured to said sleeve for stressing said spring.

7. A driving arrangement for the spindles of spinning, twisting and the like machines, which comprises a mounting beam, a bush secured in an upper flange of said beam, a spindle mounted in said bush, a pair of bearings in said beam, a directly driven driving shaft journalled in said bearings and coaxial with said spindle, a friction driver between said spindle and said shaft constituted by a plate on said spindle, a disc on said driving shaft, said plate and said disc lying upon one another in face-to-face relationship, and a spring continuously urging said parts into frictional engagement with one another, a recessed member on said shaft, and a centering bearing in said recess into which the shaft of said spindle projects.

8. A driving arrangement for the spindles of spinning, twisting and the like machines, which comprises a mounting beam, a bush secured in an upper flange of said beam, a plain bearing ring consisting of two half-collars of graphite in said bush, a spindle mounted in said ring, a pair of further bearings in said beam, a directly driven driving shaft journalled in said second-mentioned bearings and coaxial with said spindle, a friction driver between said spindle and said shaft constituted by a plate on said spindle, a disc on said driving shaft, said plate and said disc lying upon one another in face-to-face relationship, and a spring continuously urging said parts into frictional engagement with one another, a recessed member on said shaft, and a centering bearing in said recess into which the shaft of said spindle projects.

ANTON PORTMANN.

REFERENCES CITED

The following references are of record in the file of this patent:

FOREIGN PATENTS

| Number | Country | Date |
|---|---|---|
| 521,727 | France | Mar. 12, 1921 |